United States Patent [19]
Zolotoochin

[11] Patent Number: 5,219,541
[45] Date of Patent: Jun. 15, 1993

[54] SODIUM HYDROXIDE PRODUCTION WITH A CALCIUM CARBONATE SEED CRYSTAL

[75] Inventor: Vladimir M. Zolotoochin, Littleton, Colo.

[73] Assignee: Tenneco Minerals Company, Del.

[21] Appl. No.: 734,495

[22] Filed: Jul. 23, 1991

[51] Int. Cl.$^5$ .............................................. C01D 1/32
[52] U.S. Cl. .................... 423/198; 423/184; 423/186; 423/206 T; 423/209; 423/641
[58] Field of Search ............... 423/206 T, 555, 179, 423/184, 165, 164, 198, 186, 641, 421, 427, 209, 183; 299/4, 5; 23/302 T

[56] References Cited
U.S. PATENT DOCUMENTS

| | | | |
|---|---|---|---|
| 3,184,287 | 5/1965 | Gancy | 423/198 |
| 3,953,073 | 4/1976 | Kube | 299/5 |
| 4,283,372 | 8/1981 | Frint et al. | 423/206 T |
| 4,344,650 | 8/1982 | Pinsky et al. | 299/4 |
| 4,401,635 | 8/1983 | Frint | 423/206 T |
| 4,451,443 | 5/1984 | Libby | 423/432 |
| 4,498,706 | 2/1985 | Ilandi et al. | 299/5 |
| 4,652,054 | 3/1987 | Copenhafer | 299/5 |

Primary Examiner—Theodore Morris
Assistant Examiner—Edward Squillante
Attorney, Agent, or Firm—Pravel, Hewitt, Kimball & Krieger

[57] ABSTRACT

Disclosed is a method of producing sodium hydroxide comprising the steps of: (a contacting trona ore and sodium hydroxide under conditions suitable to form sodium carbonate; (b) removing essentially all solids larger than 32 mesh from the sodium carbonate product of step (a); (c) contacting the sodium carbonate product of step (b) and calcium hydroxide in the presence of a suitable amount of seed crystal calcium carbonate with crystal size in the range of about 1 to about 10 microns, and under conditions suitable to form aqueous sodium hydroxide and calcium carbonate crystals with crystal size in the range of about 30 to about 50 microns; and (d) recovering aqueous NaOH from the reaction product of step (c). The seed crystals may be introduced from an external source, or made insitu in the lime slaker by the addition of a small amount of sodium carbonate into the lime slaker.

23 Claims, 1 Drawing Sheet

SODIUM HYDROXIDE PRODUCTION WITH A CALCIUM CARBONATE SEED CRYSTAL

BACKGROUND OF THE INVENTION

1. Field of the Invention

The present invention relates to a method of making sodium hydroxide. In another aspect, the present invention relates to a process for the production of sodium hydroxide from trona ore. In still another aspect, this invention relates to the control of calcium carbonate crystal size to facilitate the separation of the solid calcium carbonate from the desired liquid sodium hydroxide product, by utilization of sodium carbonate during slaking.

2. Description of the Related Art

Sodium hydroxide is a white, somewhat translucent crystalline solid, which is also known widely in the industry as "caustic soda". A major use of sodium hydroxide is to form sodium salts, thus neutralizing strong acids and solubilizing water-insoluble chemicals through the formation of the sodium salt. Sodium hydroxide is also useful in the precipitation of heavy metals as their hydroxides, and in the control of acidity of aqueous solutions.

Because of its varied chemical activity, sodium hydroxide finds utility in a wide variety of processes. For example, sodium hydroxide is utilized in processes of making tribasic sodium phosphate, sodium chlorite, sodium chloroacetate, sodium cyanide and sodium formate. Sodium hydroxide is also utilized in the refining of kraft process pulp to higher content alpha cellulose, petroleum refining, manufacture of detergents, manufacture of soaps, textile processing, and metal processing. In addition, sodium hydroxide also finds utility in refining vegetable oils, water and acid waste stream treatment, pH control, alkaline bottle washing formulations and in groundwood pulp bleaching.

Sodium hydroxide has been produced from soda ash since shortly after the development of the Leblanc synthetic soda ash process in the early 18th century. In this lime-soda process, dry, pure soda ash (sodium carbonate) was dissolved in water and mixed with milk of lime (hydrated lime in water) to form sodium hydroxide in solution and calcium carbonate solids. Separation of the solids from the liquor resulted in a 10 to 12 percent sodium hydroxide solution that could be used directly or concentrated to a desired concentration. However, this process utilizes very pure sodium carbonate, i.e., greater than 99.5% sodium carbonate, and is known for sodium hydroxide product that is low in metals, organic carbons and insoluble impurities. The principle disadvantage of this process is that it requires an extremely pure soda ash feed, which is economically prohibitive.

When the electrolytic process for caustic and chlorine was developed, this process could compete only with great difficulty and its use has gradually dwindled. The lime-soda process is no longer used to produce caustic soda for sale, but is still used by industry in processes such as kraft recovery and to a limited extent in the production of alumina, in which lime and soda ash are charged to barrite digesters. Under the digester operating conditions, the reaction is not complete, resulting in a loss of efficiency and other difficulties. Consequently, most alumina plants prefer to charge caustic soda directly to the digesters.

Since the development of the electrolytic process over 50years ago, the lime-soda process has slowly been displaced. In the electrolytic process, saturated sodium chloride brine is fed to an electrolytic cell where 10 to 12 percent sodium hydroxide, along with hydrogen gas are produced at the cathode, and chlorine is produced at the anode. The reaction may be expressed as:

$$2NaCl + 2H_2O \xrightarrow{\text{Direct Current}} 2NaOH + H_2 + Cl_2$$

The sodium hydroxide thus produced may be concentrated to the desired concentration, generally from 50 to 73 weight percent, by evaporation. During this evaporation process, most of the unreacted sodium chloride crystallizes, is separated from the caustic and is recycled back into the electrolytic cell feed system.

This process is economically viable if the chlorine by-product can be sold. However, in recent times the demand for chlorine has not maintained a balance with sodium hydroxide demand. Environmental concerns related to chlorine containing compounds impact the demand for chlorine as the use of chlorine containing compounds is curtailed or prohibited. Examples of such chlorine containing compounds include vinyl chloride, a number of highly chlorinated high volume pesticides, ethylene dichloride as lead scavengers in gasoline, fluorocarbon aerosol propellants, polychlorinated biphenyls, and chlorine and chlorine-containing chemicals used water and sewage treatment.

Accordingly, the need exists in the industry for an economical process for the production of sodium hydroxide, without chlorine coproduction.

SUMMARY OF THE INVENTION

According to one embodiment of this invention there is provided a method of producing sodium hydroxide from trona ore, which utilizes appropriately sized seed crystals in causticization to produce larger sized crystals of calcium carbonate to facilitate an easier separation of the liquid sodium hydroxide and the calcium carbonate crystals. The method comprises: (a) contacting trona ore with sodium hydroxide to form sodium carbonate and water; (b) removal of solids greater than 32 mesh from the product of step (a); (c) reacting the sodium carbonate of step (b) with calcium hydroxide in the presence a suitable amount of calcium carbonate seed crystals with crystal size between about 1 to about 10 microns to form calcium carbonate crystals with particle size between about 30 to about 150 microns; and (d) separation of the sodium hydroxide and calcium carbonate in step (c). The seed crystals utilized in step (c) may be produced by any method. In a preferred embodiment of the present invention, the seed crystals are produced insitu in the lime slaker by reacting calcium oxide and water in the presence of sodium carbonate. As the lime is slaked to form calcium hydroxide, some of calcium hydroxide and sodium carbonate react to form the calcium carbonate seed crystals which are introduced into the causticization with the calcium hydroxide.

DETAILED DESCRIPTION OF THE INVENTION

Figure 1:
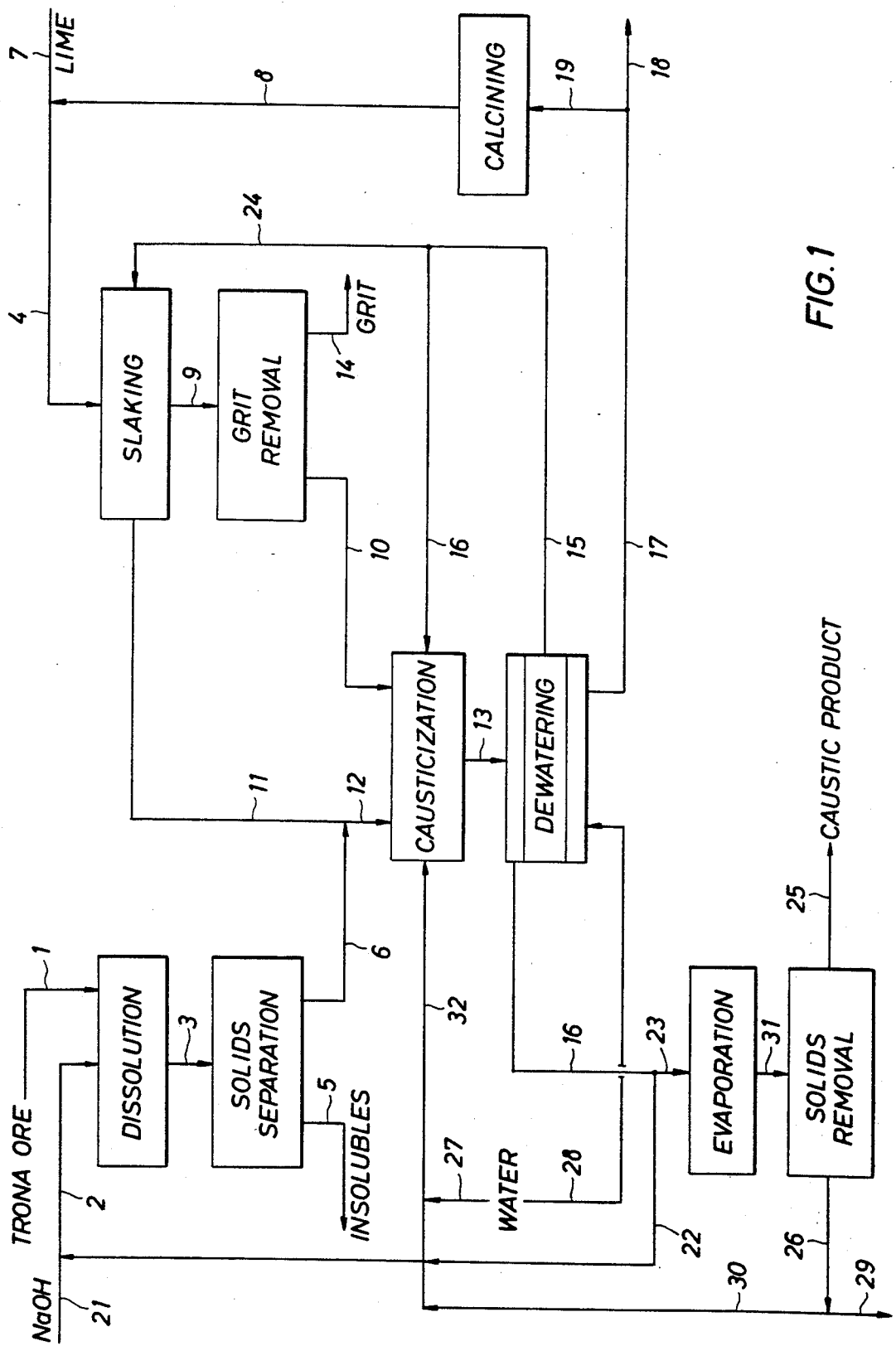
FIG. 1 is a schematic process diagram of one embodiment of the present invention.

In the present invention, sodium hydroxide is produced from trona ore. The process of the present invention may best be described by reference to the process flow diagram of FIG. 1.

In the dissolution step of the present process, stream 1 comprising trona ore and stream 2 comprising sodium hydroxide are contacted together in a dissolution system under suitable conditions to produce sodium carbonate and water.

The dissolution temperature must at least be high enough to allow the trona to be easily solubilized into solution, and therefore allow for a reasonable and economic retention time in the dissolution step. To avoid having to provide costly pressure vessels and equipment, the upper range for the dissolution temperature is generally not much higher than the boiling point of the dissolution solution. Suitable dissolution temperatures generally include temperatures in the range of about 100° F. to about 250° F. Preferably, the dissolution temperatures are in the range of about 120° F. to about 220° F.

Trona dissolution may be conducted under a broad range of pressures, ranging from a vacuum to high pressures. However, to avoid costly pressure equipment and process difficulties, trona dissolution is generally conducted at or near atmospheric pressure. Suitable trona dissolution pressures are generally in the range of about 0 psig to about 50 psig, and preferably at about atmospheric pressure.

The dissolution residence time will be dependent upon the solubility of the trona ore in the dissolution solution. Generally dissolution residence times will range up to about 2 hours. Preferably, dissolution residence times are in the range of about 10 minutes to about 60 minutes, most preferably in the range of about 15 minutes to about 50 minutes.

Trona ore is generally obtained from naturally occurring subterranean deposits, most of which are in Wyoming, and consists mainly of sodium sesquicarbonate, $Na_2 \cdot CO_3 \, NaHCO_3 \cdot 2H_2O$. The trona ore contains comparatively high quantities of insoluble matter, organic carbon, and other impurities, for example such as iron and silica.

| Component | Wt. % |
| --- | --- |
| $Na_2.CO_3.NaHCO_3.2H_2O$ | 85–95 |
| Insolubles | 4–10 |
| Organic Carbon | 0.002–0.01 |
| Free Moisture | 0.5–10.0 |
| $Na_2.CO_3.CaCO_3$ | 1.0–3.0 |
| NaCl | 0.15–0.4 |

In an alternative embodiment not shown, trona ore may be converted into sodium carbonate by heat calcining instead of chemically with sodium hydroxide.

Stream 2 is an aqueous stream that generally comprises in the range of about 5 to about 50 weight percent sodium hydroxide, and preferably in the range of about 10 to about 12 weight percent sodium hydroxide. The sodium hydroxide of stream 2 may be supplied from an external source and/or supplemented by sodium hydroxide recycle from within the process. In the embodiment shown, stream 21 is sodium hydroxide supplied from an external source, and steam 22 is dewatered sodium hydroxide recycled from the causticization step.

The dissolution of trona ore via its reaction with sodium hydroxide results in the release of water of hydration from the trona ore and is represented by:

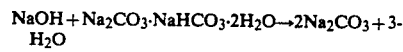

$$NaOH + Na_2CO_3 \cdot NaHCO_3 \cdot 2H_2O \rightarrow 2Na_2CO_3 + 3H_2O$$

The dissolution of the trona ore is accomplished in one or more agitated tanks that may be arranged in parallel or series configuration.

The composition of the final aqueous dissolution product (stream 3) will be limited by its solubility at the operating conditions. Generally, the final aqueous dissolution product comprises in the range of about 10 to about 30 weight percent sodium carbonate.

The dissolution step product (stream 3) is then processed to remove solids and other insolubles. These solids and insolubles are generally introduced into the system via the trona ore. It is important to remove these solids before substantial solubilization of the solids has occurred by caustic and sodium carbonate solution present during dissolution.

Generally, particles larger than about 32 mesh should be removed in the solids separation step following the dissolution. Preferably, particles larger than about 325 mesh should be removed in the solids separation.

These solids may be removed by any suitable technique. Methods of removing solids from liquids are well known to those of skill in the art, and include methods utilizing filters, rake or screw classifiers, decanters, thickeners and centrifuges.

The removed particles are disposed of in a suitable manner via stream 5. In the embodiment shown, the aqueous solution of sodium carbonate, stream 6 is then further processed, with part of the stream fed to the slaker, and most fed to the causticizer. This aqueous solution generally comprises in the range of about 10 to about 30 weight percent sodium carbonate.

In addition to sodium carbonate of stream 12, sodium carbonate may optimally be recycled into the causticizer from the causticizer dewaterer (steam 16) and from the solids removal step (stream 30).

Generally an excess of up to about 40 mole percent of sodium carbonate is present in the causticizer to drive the reaction toward sodium hydroxide.

In the causticization step, sodium carbonate and calcium hydroxide ("milk of lime") are contacted together under conditions suitable to form sodium hydroxide solution and calcium carbonate crystals. The reaction may be represented as follows:

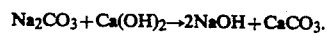

$$Na_2CO_3 + Ca(OH)_2 \rightarrow 2NaOH + CaCO_3.$$

Causticization of sodium carbonate with calcium hydroxide is well known. Suitable causticization temperatures are generally at temperatures near the boiling point of the causticization liquid. Generally such temperatures are in the range of about 50° F. below the boiling point to about the boiling point of the liquid, and preferably in the range of about 10° F. below the boiling point to about the boiling point of the causticizer liquid. Typical causticization temperatures for near ambient pressures are in the range of about 100° F. to about 220° F.

The causticization may be conducted at a wide range of pressures ranging into the hundreds of pounds per square inch. However, for ease of operation, and process economics low pressures are generally utilized. Typical causticization pressures range up to about 100 psig, and are preferably at about ambient atmospheric pressure.

Without the proper crystal habit, the calcium carbonate crystals formed in the causticizer will be fines on the order of 10 microns. Such fines result in high settling times, and make it very difficult to economically separate the calcium carbonate crystals from the desired sodium hydroxide.

According to one embodiment of the present invention an economical way of separating the sodium hydroxide and calcium carbonate is by making larger calcium carbonate crystals which are easier to separate from the liquid sodium hydroxide.

Larger calcium carbonate crystals can be obtained by introducing a sufficient amount of seed crystals of calcium carbonate into the causticizer, so that larger particles of calcium carbonate will be formed in the causticizer. Generally, the introduction of calcium carbonate seed crystals on the order of about 1 to about 10 microns will allow the production of calcium carbonate crystals in the causticizer on the order of about 30 to about 150 microns. Thus the calcium carbonate crystals are of sufficient particle size and density so that an economic settling time may be achieved in the causticizer, and separation of the calcium carbonate crystals and the desired sodium hydroxide is more easily facilitated.

The calcium carbonate seed crystals may be added to the causticizer from an outside source. In the embodiment shown, the calcium carbonate crystals are produced insitu in the lime slaker and then fed to the causticizer in the milk of lime.

The calcium carbonate seed crystal concentration may vary from about 0.2 to about 20 weight percent based on the weight of the reactants. Preferably the concentration is in the range of about 2 to about 6 weight percent.

Generally the calcium hydroxide utilized in the causticizer is produced as milk of lime in a slaking process in which lime (calcium oxide) is reacted with water. The presence of a small amount of sodium carbonate in the lime slaker produces a small amount of about 1 to about 10 micron calcium carbonate crystals through reaction with the calcium hydroxide. It is this calcium carbonate that helps to control the ultimate particle size of the calcium carbonate crystals in the causticizer.

Generally sodium carbonate is present in the lime slaker in an amount suitable to form sufficient calcium carbonate nuclei to properly control the crystal habit in the causticizer. Generally sodium carbonate is present in the lime slaker in an amount in the range of about 0.2 to about 20 weight percent, based on the total weight of the slaker reactants. Preferably, sodium carbonate is present in the slaker in an amount in the range of about 4 to about 16 weight percent, and preferably in the range of about 4 to about 6 weight percent.

In the embodiment shown, sodium carbonate may be fed to the lime slaker via stream 11 from the solids separation step, or recycled from the solids removal step (stream 30) or from the causticization dewatering step (stream 24). Optionally, sodium carbonate may be supplied to the lime slaker from an external source.

The lime or calcium oxide utilized in the slaker (stream 4) may be from an external source (stream 7) and/or recycled from the causticizer, once it has been dewatered and calcined (stream 8).

Once the calcium oxide and water have been reacted in the slaker to form calcium hydroxide, the resulting product must be processed to remove particles such as fines, grit and other insolubles. The major impurity to be removed is insoluble silica which comprises in the range of about 2 to about 3 weight percent of the lime being fed to the slaker.

The amount of silica removed in the grit removal step will depend on the caustic product desired. Generally the final caustic product will comprise less than about 800 ppm silica, and preferably less than about 500 ppm silica.

The grit removal step is generally accomplished by any suitable technique. Methods of removing solids from liquids are well known to those of skill in the art, and include methods include filters, rake or screw classifiers, decanters, thickeners and centrifuges.

In the embodiment shown, stream 9 from the slaker comprising the particulate material is fed to the lime slaker. The removed particle material is removed via stream 14 in any suitable manner. The calcium hydroxide product is then fed to the causticizer via stream 10.

After sodium carbonate and calcium hydroxide have been reacted in the causticizer to form aqueous sodium hydroxide and calcium carbonate crystals, this resultant product mixture is then processed in a dewatering step in which any appropriate means may be utilized to separate the solid calcium carbonate crystals from the aqueous sodium hydroxide solution. Such methods include countercurrent decantation, or countercurrent filtration. In such multistage processes, aqueous sodium hydroxide is recovered from the first stage as product with optionally part of the sodium hydroxide recycled to assist in trona ore dissolution. Water is generally fed to such multistage processes from the bottom or last stage and flow countercurrent from the solids and exists in the second to last stage with alkali values. The calcium carbonate crystals are recovered in the bottom stage and recovered via centrifuging and/or filtering.

In the embodiment shown, causticizer product stream 13 is fed to the dewatering step. Sodium carbonate is recycled via stream 15 to the causticizer (stream 16) and/or to the slaker (step 24). Water is supplied to the dewatering step via stream 28. Calcium carbonate is recovered via stream 17 where it may be utilized externally via stream 18, or recycled via steam 19 to the calciner and ultimately recycled back into the slaker via stream 8.

Calcium carbonate from the last wash stage can be sent for reburning to be converted into calcium oxide (lime) by any of the well known methods, or recovered as product to be used externally. Alternatively, the calcium carbonate could be recycled into the causticizer to function as seed crystal.

Aqueous sodium hydroxide is recovered via stream 16 and may be recycled via stream 22 to the trona dissolution step, or further processed via stream 23. The sodium hydroxide product of stream 23 is first concentrated by water evaporation. Evaporation product stream 31 is fed to a solids removal step where sodium carbonate crystals are recovered via stream 26 which may be recovered as external product via stream 29 and/or recycled. Sodium carbonate recycle stream 30 may be diluted with water stream 27 both of which comprise causticizer feed steam 32.

Sodium hydroxide product is recovered from the solids removal step as 50% aqueous sodium hydroxide (stream 25).

EXAMPLES

EXAMPLE 1

A 1000 gram sample of trona ore is mixed with a solution containing 1813 grams of water, 164 grams NaOH, and 26 grams of $Na_2CO_3$. This liquid composition approximates that of a diluted causticization operation product solution. When the slurry is agitated for nine minutes at 160° C., essentially complete dissolution of the trona occurs. This result demonstrates how quickly and completely the dissolution takes place if the proper conditions are maintained.

EXAMPLE 2

A series of tests were performed utilizing varying concentrations of sodium carbonate in the solution used for the slaking operation in order to determine the effect of slaking conditions on the causticization operation. The results of these tests are summarized as follows:

| Test Series | $Na_2CO_3$ (equiv.) % (Wt.) | Causticizer Solids Ultimate Settling Density (%, Wt.) | Time to Settling Break Point (Min.) |
| --- | --- | --- | --- |
| 1 | 0 | 23.5–24.5 | 80–90 |
| 2 | 4–5 | 46–45 | 3.5–4.5 |
| 3 | 15–16 | 52–58 | 5–10 |

Obviously, the presence of sodium carbonate in the slaking operation has a major effect on both the settling time and ultimate solids settling density of the causticizer product solids. These attributes have important economic significance when sizing development for a commercial operation.

EXAMPLE 3

One contaminant of caustic can be silicon, material present in both lime and trona ore. Silicon is soluble in caustic solutions of all concentrations. This becomes a real concern when practicing this invention. Several tests were run to determine the proper method of processing in this regard. Attached FIG. 2 presents the test results. In the first place, it was determined that not all lime is suitable when practicing this invention. Only lime where silica is present in coarse form with total concentration not to exceed 3% by weight should be used. All silicon present in lime should be coarse, plus 32 mesh or coarser. An immediate separation from the slaker solution is essential, how it is demonstrated by the test work when a conventional slaker is used and the grit (silicon) is removed immediately after the slaking reaction. Similar results are obtained during trona loading.

Therefore, this invention incorporates the removal of grit and insoluble coarser than 32 mesh at the earliest possible point consistant with good lime and trona utilization, respectively, in order to maintain a minimum concentration of silicon (normally expresses as silica concentration) below 150 ppm (as in tests with conventional lime slaker with grit removal).

EXAMPLE 4

Stoichiometric quantities of dissolved trona and lime in the causticization operation will not result in a full reaction of either. Tests have shown that with lime addition of 90% to 115% of stoichiometric, sodium carbonate concentrations of 14% to 25% and at causticizing times of 60–90 minutes, sodium carbonate conversion to caustic will be between 70% and 98%. in one such test using a 20% sodium carbonate solution and 91% of the stoichiometric quantity of lime, and 84% Conversion to caustic was obtained. Another test utilizing a 14% sodium carbonate solution and a lime quantity of 103% of stoichiometric yielded a 93.4% conversion. The temperature at which the caustization is carried out has little effect on the degree of conversion; however, in order to complete the conversion in a reasonable length of time, the temperature should be maintained above 80° C.

I claim:

1. A method of producing sodium hydroxide comprising the steps of:
   (a) contacting trona ore and sodium hydroxide to form a sodium carbonate product;
   (b) removing essentially all solids larger than 32 mesh from the sodium carbonate product of step (a) forming a sodium carbonate product of step (b);
   (c) contacting the sodium carbonate product of step (b) and calcium hydroxide in the presence of calcium carbonate seed crystal with crystal size in the range of about 1 to about 10 microns, to form a reaction product comprising aqueous sodium hydroxide and calcium carbonate crystals with crystal size in the range o. about 150 microns; and
   (d) recovering as separate products, calcium carb aqueous NaOH from the reaction product of step (c).

2. The method of claim 1 wherein the trona ore comprises in the range of about 85 to about 95 weight percent $Na_2 \cdot CO_3 \cdot NaHCO_3 \cdot 2H_2O$, in the range of about 4 to about 10 weight percent insolubles, in the range of about 0.002 to about 0.01 weight percent organic carbon, in the range of about 0.5 to about 10.0 free moisture, in the range of about 1.0 to about 3.0 weight percent $Na_2 \cdot CO_3 \cdot CaCO_3$, and in the range of about 0.15 to about 0.4 weight percent NaCl.

3. The method of claim 1 wherein the seed crystal comprises seed crystal produced by contacting lime and water in the presence of about 0.2 to about 20 weight percent of sodium carbonate based on the total weight of water and lime.

4. The method of claim 3 wherein essentially all of any insolubles present larger than mesh with the produced seed crystal is removed.

5. The method of claim 3 wherein the lime comprises a portion of the calcium carbonate of step (d) which has been calcined into lime.

6. The method of claim 1 wherein the seed crystal is produced by contacting lime and water in the presence of about 4 to about 16 weight percent sodium carbonate based on the total weight of water and lime.

7. The method of claim 6 wherein the sodium carbonate present comprises a portion of the sodium carbonate product of step (b).

8. The method of claim 1 wherein the seed crystal is produced by contacting lime and water in the presence of about 4 to about 6 weight percent sodium carbonate based on the total weight of water and lime.

9. The method of claim 1 wherein step (a) is conducted at temperatures in the range of about 100° F. to about 250° F., at pressures ranging up to 100 psig, and for times ranging up to 2 hours.

10. The method of claim 1 comprising in step (b) removing essentially all solids larger than 325 mesh from the sodium carbonate product of step (a).

11. The method of claim 1 wherein the sodium carbonate product of step (b) comprises in the range of about 10 to about 30 weight percent sodium carbonate.

12. The method of claim 1 wherein step (c) is conducted at temperatures in the range of about 100° F. to about 220° F., at pressures ranging up to 100 psig, and for times ranging up to 2 hours.

13. The method of claim 1 wherein the sodium hydroxide of step (d) comprises at least a portion of the sodium hydroxide of step (a).

14. The method of claim 1 wherein the sodium hydroxide of step (d) is further concentrated by removal of at least a portion of the water.

15. A method of producing sodium hydroxide comprising the steps of:
(a) contacting trona ore and sodium hydroxide to form a sodium carbonate product;
(b) removing essentially all solids larger than 30 mesh from the sodium carbonate product of step (a) to form a sodium carbonate product of step 2(b);
(c) forming a causticization product comprising aqueous sodium hydroxide and calcium carbonate crystals with crystal size in the range of about 30 to about 150 microns, by contacting the sodium carbonate product of step (b) with the reaction product of calcium oxide and water reacted in the presence of about 0.2 to about 20 weight percent sodium carbonate based on the weight of the calcium oxide and the water;
(d) recovering aqueous NaOH from the causticization product of step (c).

16. The method of claim 15 wherein the trona ore comprises in the range of about 85 to about 95 weight percent $Na_2 \cdot CO_3 \cdot NaHCO_3 \cdot 2H_2O$, in the range of about 4 to about 10 weight percent insolubles, in the range of about 0.002 to about 0.01 weight percent organic carbon, in the range of bout 0.5 to about 10.0 free moisture, in the range of about 1.0 to about 3.0 weight percent $Na_2 \cdot CO_3 \cdot CaCO_3$, and in the range of about 0.15 to about 0.4 weight percent NaCl.

17. The method of claim 15 wherein the sodium carbonate is present in the range of about 4 to about 16 weight percent based on the total weight of water and calcium oxide.

18. The method of claim 15 wherein step (a) is conducted at temperatures in the range of about 100° F. to about 250° F., at pressures ranging up to 100 psig, and for times ranging up to 2 hours.

19. The method of claim 1 comprising in step (b) removing essentially all solids larger than 325 mesh from the sodium carbonate product of step (a).

20. The method of claim 1 wherein the product of step (b) comprises in the range of about 10 to about 30 weight percent sodium carbonate.

21. The method of claim 15 wherein step (c) is conducted at temperatures in the range of about 100° F. to about 220° F., at pressures ranging up to 100 psig, and for times ranging up to 2 hours.

22. The method of claim 15 wherein the sodium hydroxide of step (d) comprises at least a portion of the sodium hydroxide of step (a).

23. The method of claim 15 wherein the sodium hydroxide of step (d) is further concentrated by removal of at least a portion of the water.

* * * * *